(12) United States Patent
Sakurai

(10) Patent No.: US 10,854,979 B2
(45) Date of Patent: Dec. 1, 2020

(54) ANTENNA SUBSTRATE AND METHOD OF MANUFACTURING SAME

(71) Applicant: KYOCERA Corporation, Kyoto (JP)

(72) Inventor: Keizou Sakurai, Yasu (JP)

(73) Assignee: Kyocera Corporation, Kyoto (JP)

( * ) Notice: Subject to any disclaimer, the term of this patent is extended or adjusted under 35 U.S.C. 154(b) by 23 days.

(21) Appl. No.: 16/468,715

(22) PCT Filed: Dec. 11, 2017

(86) PCT No.: PCT/JP2017/044405
§ 371 (c)(1),
(2) Date: Jun. 12, 2019

(87) PCT Pub. No.: WO2018/116886
PCT Pub. Date: Jun. 28, 2018

(65) Prior Publication Data
US 2019/0312331 A1 Oct. 10, 2019

(30) Foreign Application Priority Data
Dec. 22, 2016 (JP) .................................. 2016-248790

(51) Int. Cl.
*H01Q 21/06* (2006.01)
*H01Q 9/04* (2006.01)
*H01Q 1/22* (2006.01)

(52) U.S. Cl.
CPC ......... *H01Q 9/0414* (2013.01); *H01Q 1/2283* (2013.01); *H01Q 9/0457* (2013.01); *H01Q 21/065* (2013.01)

(58) Field of Classification Search
CPC .. H01Q 9/0414; H01Q 9/0421; H01Q 9/0457; H01Q 1/38; H01Q 1/2283; H01Q 21/06; H01Q 21/061; H01Q 21/065
See application file for complete search history.

(56) References Cited

U.S. PATENT DOCUMENTS

| 2014/0266947 A1* | 9/2014 | Chen | H01Q 1/2283 |
| | | | 343/772 |
| 2014/0268587 A1* | 9/2014 | Nomura | H05K 3/284 |
| | | | 361/728 |

(Continued)

FOREIGN PATENT DOCUMENTS

| CN | 103770386 A | 5/2014 |
| JP | 2000-138525 A | 5/2000 |
| JP | 2004-327641 A | 11/2004 |

*Primary Examiner* — Daniel Munoz
(74) *Attorney, Agent, or Firm* — Volpe Koenig

(57) ABSTRACT

An antenna substrate includes a cap substrate including a first antenna conductor located on upper and lower surfaces of a first insulating layer; a frame substrate including an opening located in the second insulating layer and having an outer periphery that surrounds an individual of or a collective number of outer peripheries of the plurality of first antenna conductors in a top view; a base substrate including a second antenna conductor located on an upper surface of a third insulating layer; a first adhesive material adhering the first insulating layer and the second insulating layer; and a second adhesive material adhering the second insulating layer and the third insulating layer; and the first adhesive material and the second adhesive material include a first bonding member and a second bonding member having an adhesive strength to the second insulating layer greater than that of the first bonding member.

8 Claims, 4 Drawing Sheets

(56) References Cited

U.S. PATENT DOCUMENTS

| | | | |
|---|---|---|---|
| 2016/0049723 A1 | 2/2016 | Baks et al. | |
| 2016/0095218 A1* | 3/2016 | Sakurai | H05K 1/0218 |
| | | | 361/768 |
| 2019/0312331 A1* | 10/2019 | Sakurai | H01Q 21/06 |
| 2019/0334231 A1* | 10/2019 | Sakurai | H05K 3/28 |
| 2020/0161766 A1* | 5/2020 | Liu | H01L 23/66 |

* cited by examiner

ANTENNA SUBSTRATE AND METHOD OF MANUFACTURING SAME

TECHNICAL FIELD

The present disclosure relates to an antenna substrate and a method of manufacturing the same.

BACKGROUND ART

In recent years, antenna substrates for transmitting and receiving electromagnetic waves for signals have been developed. The antenna substrate is used for wireless communication between electronic devices, an in-vehicle obstacle detection device, or the like. The antenna substrate includes a spacer and two mounting substrates. For example, Patent Literature 1 discloses manufacture of an antenna substrate by a method in which mounting substrates on the upper side and the lower side of a spacer are bonded to each other with solder or the like. However, the antenna substrate transmits and receives electromagnetic waves between first and second antenna conductors. As such, when the positional accuracy of the first and second antenna conductors is poor, stable transmission and/or reception of electromagnetic waves may not be performed.

CITATION LIST

Patent Literature

Patent Literature 1: JP 2004-327641 A

SUMMARY OF INVENTION

An antenna substrate of the present disclosure includes a cap substrate, a frame substrate, a base substrate, a first adhesive material and a second adhesive material. The cap substrate includes a first insulating layer and a plurality of first antenna conductors arranged in vertical and horizontal directions on upper and lower surfaces of the first insulating layer, the plurality of first antenna conductors being positioned opposite to each other with the first insulating layer therebetween. The frame substrate includes a second insulating layer and a plurality of openings located in the second insulating layer, each of the plurality of openings having an outer periphery that surrounds an individual or a collective number of outer peripheries of the plurality of first antenna conductors in a top view. The base substrate includes a third insulating layer and a plurality of second antenna conductors located on an upper surface of the third insulating layer. The first adhesive material is provided between a lower surface of the first insulating layer and an upper surface of the second insulating layer in a region other than a region where the opening is located, the first adhesive material adhering the first insulating layer and the second insulating layer to each other. The second adhesive material is provided between a lower surface of the second insulating layer and the upper surface of the third insulating layer in a region other than a region where the opening is located, the second adhesive material adhering the second insulating layer and the third insulating layer to each other. Each of the first adhesive material and the second adhesive material at least includes a plurality of first bonding members and a second bonding member, the plurality of first bonding members being located outside a region where the first antenna conductor is disposed, the second bonding member being partially in contact with the plurality of first bonding members, the second bonding member having an adhesive strength to the second insulating layer greater than that of the first bonding members.

A method of manufacturing an antenna substrate according to the present disclosure includes: preparing a cap substrate including a first insulating layer and a plurality of first antenna conductor, the first antenna conductor being arranged in vertical and horizontal directions with a distance between each pair of the plurality of first antenna conductors on upper and lower surfaces of the first insulating layer so as to be opposite to each other with the first insulating layer therebetween; preparing a frame substrate including a second insulating layer and an opening located in the second insulating layer, the opening having an outer periphery that surrounds an individual of or a collective number of outer peripheries of the plurality of first antenna conductor in a top view; preparing a base substrate including a third insulating layer and a plurality of second antenna conductors disposed on an upper surface of the third insulating layer; disposing a first bonding member in a region other than a region where the opening is located between a lower surface of the first insulating layer and an upper surface of the second insulating layer and between a lower surface of the second insulating layer and the upper surface of the third insulating layer, disposing the frame substrate and the cap substrate in an order of the frame substrate first and the cap substrate second on the base substrate with the first bonding member between the frame substrate and the cap substrate, and temporarily fixing the frame substrate and the cap substrate to the base substrate; and disposing a second bonding member partially making contact with the first bonding member between the lower surface of the first insulating layer and the upper surface of the second insulating layer and between the lower surface of the second insulating layer and the upper surface of the third insulating layer, the second bonding member having an adhesive strength to the second insulating layer greater than that of the first bonding members, and permanently fixing the base substrate, the frame substrate, and the cap substrate with the second bonding member.

DESCRIPTION OF EMBODIMENT

The antenna substrate transmits and receives electromagnetic waves between the first and second antenna conductors. As such, when the positional accuracy of the first and second antenna conductors is poor, stable transmission and/or reception of electromagnetic waves may not be performed.

The antenna substrate of the present disclosure includes a cap substrate including a first antenna conductor, a frame substrate including a plurality of openings, and a base substrate including a second antenna conductor. The cap substrate and the base substrate, and the frame substrate are firmly bonded to each other by a second bonding member having a large adhesive strength while the position is modified through the bonding with a first bonding member having a relatively small adhesive strength. As a result, the positional accuracy of the first and second antenna conductors is favorable, thus allowing stable transmission and reception of electromagnetic waves.

Next, the antenna substrate according to an embodiment of the present disclosure is described with reference to FIGS. 1A, 1B, and 2.

Figure 1A:
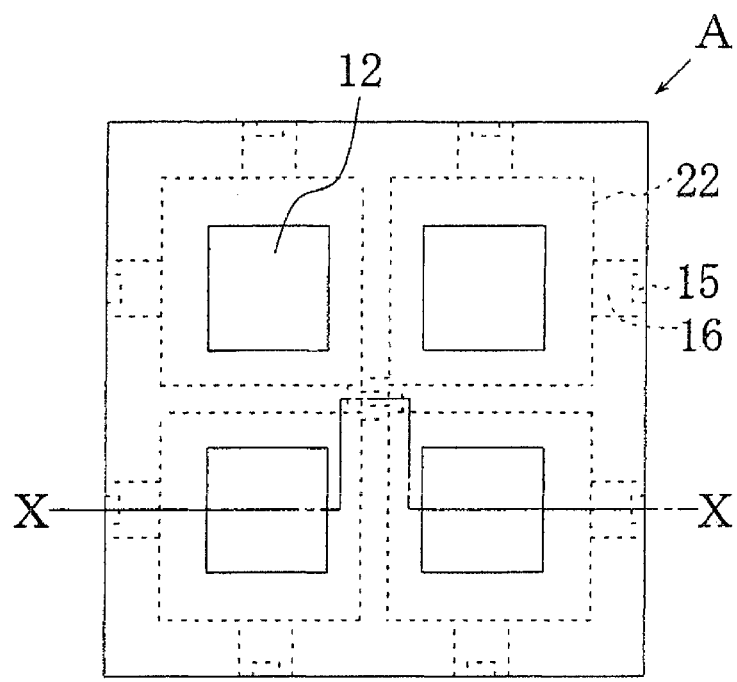
FIG. 1A is a schematic top view illustrating First Exemplary Embodiment of an antenna substrate of the present disclosure.
Figure 1B:
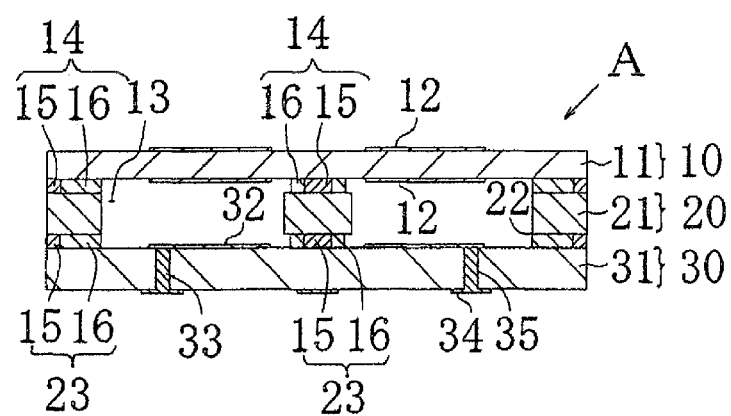
FIG. 1B is a schematic cross-sectional view taken along X-X illustrated in FIG. 1A.

FIG. 1A is a top view illustrating an exemplary embodiment of the antenna substrate of the present disclosure. FIG. 1B is a cross-sectional view taken along X-X illustrated in FIG. 1A.

An antenna substrate A includes a cap substrate 10, a frame substrate 20, and a base substrate 30. The antenna substrate A is configured with the cap substrate 10, the frame substrate 20, and the base substrate 30 that are stacked in this order from the top.

The cap substrate 10 includes a first insulating layer 11 and a plurality of first antenna conductors 12. The plurality of first antenna conductors 12 are formed in the center portion of the upper and lower surfaces of the first insulating layer 11. The plurality of first antenna conductors 12 are arranged in the vertical and horizontal directions to be opposite each other with the first insulating layer 11 therebetween. That is, the first antenna conductors 12 are formed on the upper and lower surfaces of the first insulating layer 11 such that the first antenna conductors 12 overlap each other in a top view. In this example, the plurality of first antenna conductors 12 on the upper surface of the first insulating layer 11 and the plurality of first antenna conductors 12 on the lower surface of the first insulating layer 11 are formed such that the first antenna conductor 12 on the upper surface and the first antenna conductor 12 on the lower surface that are disposed opposite each other with the first insulating layer 11 therebetween have the identical shape and the identical dimension.

The frame substrate 20 includes a second insulating layer 21 and a plurality of openings 22. The opening 22 has an outer periphery that surrounds an individual or a collective number of the outer peripheries of the first antenna conductors 12 in a top view as illustrated in FIG. 2. In other words, each opening 22 is disposed such that, when viewed from above (in a top perspective view), one of the first antenna conductors 12 or a plurality of the first antenna conductors 12 are located inside the opening 22. The opening 22 serves as a cavity 13 when sandwiched between the cap substrate 10 and the base substrate 30. The cavity 13 functions as a path for transmitting and receiving electromagnetic waves for signals between the first antenna conductor 12 and the second antenna conductor 32. The distance between the first antenna conductor 12 and the second antenna conductor 32 can be adjusted to a distance optimal for transmission and reception of electromagnetic waves for signals by adjusting the thickness of the second insulating layer 21.

The lower surface of the first insulating layer 11 and the upper surface of the second insulating layer 21 are adhered to each other with a first adhesive material 14. This adhering is performed in a portion of the first insulating layer 11 and the second insulating layer 21 where the opening 22 is not located (the first adhesive material 14 is disposed so as not to overlap a part of the first antenna conductor 12 or not to overlap the entirety of the first antenna conductor 12).

The first adhesive material 14 includes a first bonding member 15 and a second bonding member 16. The first bonding member 15 is made of, for example, natural rubber, nitrile rubber, polyimide resin, or the like.

The second bonding member 16 is made of, for example, an epoxy resin, an acrylic resin, or the like. The adhesive strength of the second bonding member 16 to the first and second insulating layers 11 and 21 is greater than the adhesive strength of the first bonding member 15. The adhesive strength of the second bonding member 16 is about 10 to 100 times greater than the adhesive strength of the first bonding member 15 in tensile shear adhesive strength (JISK6850), for example.

The base substrate 30 includes a third insulating layer 31, a plurality of second antenna conductors 32, a wiring conductor 33, and an electrode 34.

The second antenna conductor 32 is disposed on the upper surface of the third insulating layer 31 at a position facing the first antenna conductor 12. As described above, the opening 22 is provided corresponding to the first antenna conductor 12. Thus, each second antenna conductor 32 directly faces the first antenna conductor 12 with the space (the air in the cavity 13 etc.,) therebetween in the cavity 13.

The third insulating layer 31 includes a plurality of through holes 35 vertically extending through the third insulating layer 31. The wiring conductor 33 is formed on the surface of the third insulating layer 31 and inside the through hole 35. A portion of the wiring conductor 33 is connected with the second antenna conductor 32.

The lower surface of the second insulating layer 21 and the upper surface of the third insulating layer 31 are adhered with each other with the second adhesive material 23. The second adhesive material 23 includes the first bonding member 15 and the second bonding member 16 described above.

The first bonding member 15 is intended for adhering between the second insulating layer 21 and the first and third insulating layers 11 and 31 with a high positional accuracy. The second bonding member 16 is intended for strong adhering between the second insulating layer 21 and the first insulating layer 11 and the third insulating layer 31. The adhesive strength of the first bonding member 15 to the first, second, and third insulating layers 11, 21 and 31 is relatively small. In other words, the first bonding member 15 can anchor the first and third insulating layers 11 and 31 and the second insulating layer 21 in the state where the positional relationship therebetween can be modified to some extent. Thus, the first and third insulating layers 11 and 31 and the second insulating layer 21 can be firmly bonded to each other with the second bonding member 16 while modifying the positions thereof through the bonding with the first bonding member 15.

Thus, the antenna substrate A in which the frame substrate 20 and the cap substrate 10 are sequentially stacked above the base substrate 30 with the opening 22 serving as the cavity 13, is configured. The antenna substrate A has a high positional accuracy of the first antenna conductor 12 of the first insulating layer 11, the opening 22 of the second insulating layer 21, and the second antenna conductor 32 of the third insulating layer 31, whose positions have been modified.

A plurality of the electrodes 34 are formed on the lower surface of the third insulating layer 31. The electrode 34 is electrically connected to an electrode of an external electrical substrate (not illustrated). Thus, the antenna substrate A and the external electrical substrate are electrically connected.

The antenna substrate A has the following functions, for example.

First, signals transmitted from the external electrical substrate are transmitted to the second antenna conductor 32 via the electrode 34 and the wiring conductor 33.

Next, the second antenna conductor 32 receiving the signal emits electromagnetic waves.

Next, the emitted electromagnetic waves propagate within the cavity 13 and propagate sequentially to the first antenna conductor 12 on the lower surface side of the first insulating layer 11 and the first antenna conductor 12 on the upper surface side of the first insulating layer 11.

Finally, the first antenna conductor 12 on the upper surface emits electromagnetic waves toward the outside. Alternatively, the first antenna conductor 12 has a function of transmitting, to the external electric substrate, electromagnetic waves received from the outside as signals by a route opposite to the above-mentioned route.

Thus, in the antenna substrate A, transmission and reception of electromagnetic waves are favorably performed by matching the positional accuracies of the first antenna conductor 12 and the second antenna conductor 32 that are opposite to each other. In the antenna substrate A, by maintaining a constant distance between the first antenna conductor 12 and the second antenna conductor 32, stable transmission and reception of electromagnetic waves therebetween is achieved.

The first to third insulating layers 11, 21 and 31 are composed of electrical insulation materials that are obtained by impregnating a glass cloth with a thermosetting resin such as an epoxy resin or a bismaleimide triazine resin, and by thermally curing the cloth with heat and pressure into a flat shape, for example.

The opening 22 is formed by drill machining or router machining, for example.

The through hole 35 is formed by drill machining, laser machining, or blast machining, for example.

The first and second antenna conductors 12 and 32 and the wiring conductor 33 are formed by a known plating technique with a highly conductive metal such as copper plating, for example.

As described above, the antenna substrate A of the present example is configured by firmly bonding the first and third insulating layers 11 and 31 and the second insulating layer 21 to each other with the second bonding member 16 while modifying the positions of the first and third insulating layers 11 and 31 and the second insulating layer 21 through the bonding with the first bonding member 15 having a relatively small adhesive strength to each insulating layer. It is thus possible to provide that the antenna substrate A has a high positional accuracy of the first antenna conductor 12 and the second antenna conductor 32 and can stably transmit and receive electromagnetic waves for signals.

Next, an example of steps in the method of manufacturing the antenna substrate of the present disclosure is described with respect to FIGS. 3A to 3D. Note that components identical to those illustrated in FIGS. 1A, 1B, and 2 are denoted with the same reference signs, and detailed descriptions thereof are omitted.

Figure 3A:
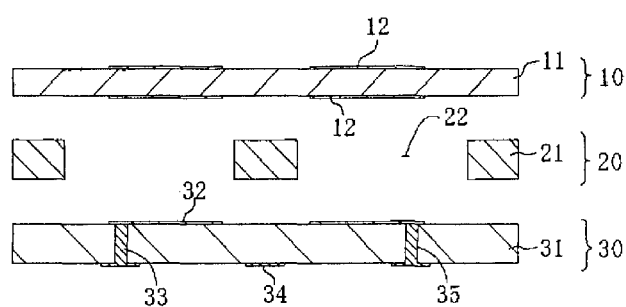
FIG. 3A is a schematic cross-sectional view illustrating an example of the steps in a method of manufacturing the antenna substrate of the present disclosure.

First, as illustrated in FIG. 3A, the cap substrate 10, the frame substrate 20, and the base substrate 30 are prepared.

Figure 3B:
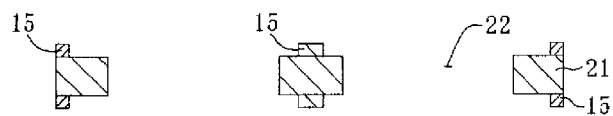
FIG. 3B is a schematic cross-sectional view illustrating an example of the steps in the method of manufacturing the antenna substrate of the present disclosure.

Next, as illustrated in FIG. 3B, the first bonding member 15 is disposed on the upper surface and the lower surface of the second insulating layer 21 of the frame substrate 20. Note that in the present example, the first bonding member 15 is disposed on the outer peripheral edge of the second insulating layer 21, but the first bonding member 15 may be disposed at a position adjacent to the opening 22.

Figure 3C:
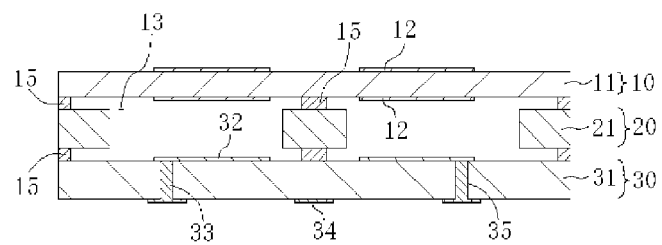
FIG. 3C is a schematic cross-sectional view illustrating an example of the steps in the method of manufacturing the antenna substrate of the present disclosure.

Next, as illustrated in FIG. 3C, the cap substrate 10 is placed on the upper surface of the frame substrate 20, and temporarily fixed thereto. The base substrate 30 is placed on the lower surface of the frame substrate 20 and temporarily fixed thereto. The cap substrate 10 and the frame substrate 20, and the frame substrate 20 and the base substrate 30 are temporarily fixed. It is thus possible to adjust the opposing positions of the first antenna conductor 12 and the second antenna conductor 32 that are disposed opposite each other.

Figure 3D:
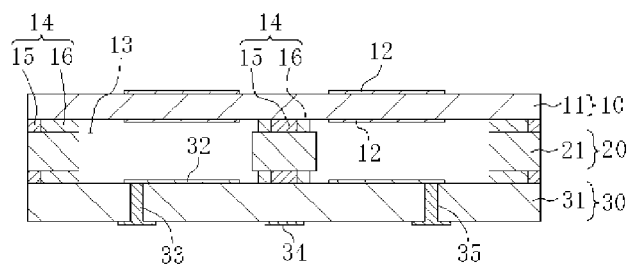
FIG. 3D is a schematic cross-sectional view illustrating an example of the steps in the method of manufacturing the antenna substrate of the present disclosure.

Finally, as illustrated in FIG. 3D, the second bonding member 16 is disposed such that the second bonding member 16 partially makes contact with the first bonding member 15 between the cap substrate 10 and the frame substrate 20 and between the frame substrate 20 and the base substrate 30, whose positions have been adjusted. As a result, the cap substrate 10 and the frame substrate 20, and the frame substrate 20 and the base substrate 30 are permanently fixed.

As described above, according to the method of manufacturing the antenna substrate A of the present example, the cap substrate 10 and the frame substrate 20, and the frame substrate 20 and the base substrate 30 are temporarily fixed with the first bonding member 15. Thus, the opposing positions of the first antenna conductor 12 and the second antenna conductor 32 can be adjusted. The second bonding member 16 is disposed such that the second bonding member 16 partially makes contact with the first bonding member 15 between the cap substrate 10 and the frame substrate 20 and between the frame substrate 20 and the base substrate 30, whose positions have been adjusted. As a result, the cap substrate 10 and the frame substrate 20, and the frame substrate 20 and the base substrate 30 are permanently fixed. It is thus possible to provide the antenna substrate A to be capable of stable transmission and reception of electromagnetic waves for signals between the first antenna conductor 12 and the second antenna conductor 32.

The present disclosure is not limited to the above-described example embodiments, and various modifications or improvements may be made within the scope of the recitations of the claims. For example, while the first bonding member 15 is composed only of a resin in the above-mentioned exemplary embodiments, the first bonding member 15 may include at least one of solid fibers and solid particles having a fixed outer diameter dimension. With such a configuration, the distance between the cap substrate 10 and the frame substrate 20, or the distance between the frame substrate 20 and the base substrate 30 can be maintained at a dimension corresponding to the outer diameter of the solid component. As a result, a constant distance between the first antenna conductor 12 and the second antenna conductor 32 can be maintained, thus allowing for stable transmission and/or reception of electromagnetic waves therebetween. Examples of the solid particles include silica, alumina, titanium oxide, and the like. Examples of the solid fibers include glass fibers, carbon fibers, aramid fibers, and the like.

The first bonding member 15 may be an adhesive tape containing natural rubber, nitrile rubber, polyimide resin, or the like as a component. It is sufficient that the first bonding member 15 can achieve bonding in the form of adhering or the like in a short time even with a bonding strength smaller than that of the second bonding member 16. In particular, adhesive tapes that can be immediately temporarily fixed are suitable from the perspective of workability of the temporary fixing.

Figure 2:
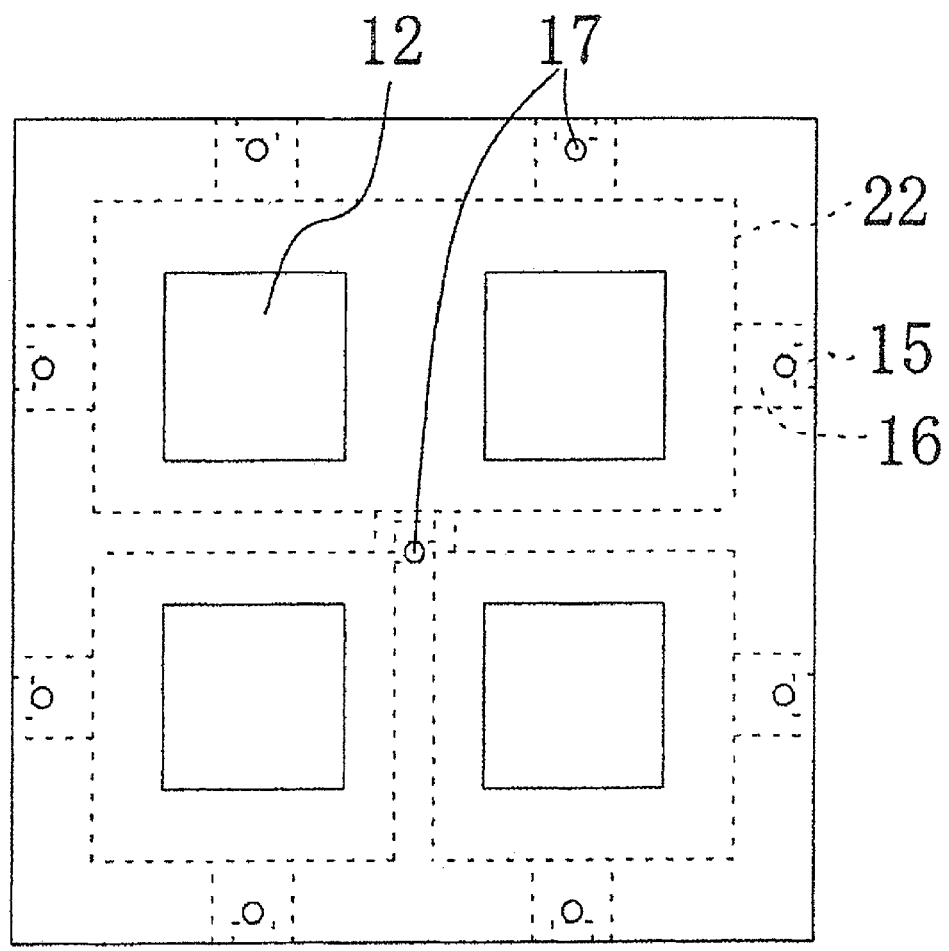
FIG. 2 is a schematic top view illustrating Second Exemplary Embodiment of the antenna substrate of the present disclosure.

As illustrated in FIG. 2, the cap substrate 10, or the base substrate 30, or, both the cap substrate 10 and the base substrate 30 may be provided with injection holes 17 for disposing the second adhesive material 23, for example.

REFERENCE SIGNS LIST

10 Cap substrate
11 First insulating layer
12 First antenna conductor
14 First adhesive material
15 First bonding member
16 Second bonding member
20 Frame substrate
21 Second insulating layer
22 Opening
23 Second adhesive material
30 Base substrate
31 Third insulating layer
32 Second antenna conductor
A Antenna substrate

The invention claimed is:

1. An antenna substrate comprising:
   a cap substrate including a first insulating layer and a plurality of first antenna conductors arranged in vertical and horizontal directions on upper and lower surfaces of the first insulating layer, the plurality of first antenna conductors being positioned opposite to each other with the first insulating layer therebetween;
   a frame substrate including a second insulating layer and a plurality of openings located in the second insulating layer, each of the plurality of openings having an outer periphery that surrounds an individual or a collective number of outer peripheries of the plurality of first antenna conductors in a top view;
   a base substrate including a third insulating layer and a plurality of second antenna conductors located on an upper surface of the third insulating layer;
   a first adhesive material provided between a lower surface of the first insulating layer and an upper surface of the second insulating layer in a region other than a region where the opening is located, the first adhesive material adhering the first insulating layer and the second insulating layer to each other; and
   a second adhesive material provided between a lower surface of the second insulating layer and the upper surface of the third insulating layer in a region other than a region where the opening is located, the second adhesive material adhering the second insulating layer and the third insulating layer to each other, wherein
   each of the first adhesive material and the second adhesive material at least includes a plurality of first bonding members and a second bonding member, the plurality of first bonding members being located outside a region where the first antenna conductor is disposed, the second bonding member being partially in contact with the plurality of first bonding members, the second bonding member having an adhesive strength to the second insulating layer greater than that of the first bonding members.

2. The antenna substrate according to claim 1, wherein the first bonding member includes at least one of solid particles and solid fibers in at least one of the first adhesive material and the second adhesive material.

3. The antenna substrate according to claim 1, wherein the first bonding member includes at least one of solid particles and solid fibers in both the first adhesive material and the second adhesive material.

4. The antenna substrate according to claim 1, wherein the first antenna conductors overlap each other on the upper and lower surfaces of the first insulating layer in a top view.

5. The antenna substrate according to claim 4, wherein, in the plurality of first antenna conductors on the upper surface of the first insulating layer and the plurality of first antenna conductors on the lower surface of the first insulating layer, a first antenna conductor on the upper surface and a first antenna conductor on the lower surface disposed opposite each other with the first insulating layer therebetween have an identical shape and an identical dimension.

6. The antenna substrate according to claim 1, wherein the opening sandwiched between the cap substrate and the base substrate is a cavity serving as a path for transmitting and receiving electromagnetic waves for signals between the first antenna conductor and the second antenna conductor.

7. A method of manufacturing an antenna substrate, the method comprising:
   preparing a cap substrate including a first insulating layer and a plurality of first antenna conductors, the plurality of first antenna conductors being arranged in vertical and horizontal directions with a distance between each pair of adjacent first antenna conductors on upper and lower surfaces of the first insulating layer so to be opposite to each other with the first insulating layer therebetween;
   preparing a frame substrate including a second insulating layer and an opening located in the second insulating layer, the opening having an outer periphery that surrounds an individual of or a collective number of outer peripheries of the plurality of first antenna conductors in a top view;
   preparing a base substrate including a third insulating layer and a plurality of second antenna conductors disposed on an upper surface of the third insulating layer;
   disposing a first bonding member in a region other than a region where the opening is located between a lower surface of the first insulating layer and an upper surface of the second insulating layer and between a lower surface of the second insulating layer and the upper surface of the third insulating layer, disposing the frame substrate and the cap substrate in an order of the frame substrate first and the cap substrate second on the base substrate with the first bonding member between the frame substrate and the cap substrate, and temporarily fixing the frame substrate and the cap substrate to the base substrate, and
   disposing a second bonding member partially making contact with the first bonding member between the lower surface of the first insulating layer and the upper surface of the second insulating layer and between the lower surface of the second insulating layer and the upper surface of the third insulating layer, and permanently fixing the base substrate, the frame substrate, and the cap substrate with the second bonding member.

8. The method of manufacturing an antenna substrate according to claim 7, wherein a bonding member containing at least one of solid particles and solid fibers is used as the first bonding member.

\* \* \* \* \*